(12) United States Patent
Graichen et al.

(10) Patent No.: US 11,560,952 B2
(45) Date of Patent: Jan. 24, 2023

(54) VARIABLE CYLINDER WALL FOR SEALS ON PLUG VALVE

(71) Applicant: Hanon Systems, Daejeon (KR)

(72) Inventors: Brian Graichen, Leonard, MI (US); Ed Sanders, Monroe, MI (US)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 17/141,315

(22) Filed: Jan. 5, 2021

(65) Prior Publication Data

US 2022/0065356 A1     Mar. 3, 2022

Related U.S. Application Data

(60) Provisional application No. 63/072,991, filed on Sep. 1, 2020.

(51) Int. Cl.
*F16K 5/18* (2006.01)
*F16K 5/02* (2006.01)
*F16K 11/085* (2006.01)

(52) U.S. Cl.
CPC .............. *F16K 5/18* (2013.01); *F16K 5/0257* (2013.01); *F16K 11/085* (2013.01); *Y10T 137/87249* (2015.04)

(58) Field of Classification Search
CPC ........ F16K 5/0257; F16K 5/18; F16K 11/085; F16K 11/0856; F16K 11/0853; F16K 27/065; Y10T 137/87249
USPC ................. 251/314, 309, 311, 192, 317, 316
See application file for complete search history.

(56) References Cited

U.S. PATENT DOCUMENTS

| | | | | |
|---|---|---|---|---|
| 2,653,791 A * | 9/1953 | Mueller | ................ | F16K 5/0278 137/246.15 |
| 4,655,252 A * | 4/1987 | Krumhansl | ......... | F16K 11/0853 137/269 |
| 5,273,073 A * | 12/1993 | Romanchik | ......... | F16K 11/0853 137/625.46 |
| 6,308,739 B1 * | 10/2001 | Barbuto | ................ | F16K 5/0478 137/625.11 |
| 6,976,505 B2 * | 12/2005 | McLane | ............ | B60H 1/00485 123/41.1 |

(Continued)

FOREIGN PATENT DOCUMENTS

KR     20180072781 A     6/2018
KR     20190056029 A     5/2019

*Primary Examiner* — Mary E McManmon
*Assistant Examiner* — Andrew J Rost
(74) *Attorney, Agent, or Firm* — Shumaker, Loop & Kendrick, LLP; James D. Miller

(57) ABSTRACT

A rotary valve includes a rotary component configured to rotate about an axis of rotation thereof. The rotary component includes a plurality of fluid openings formed at an exterior surface thereof with each of the fluid openings forming a fluid inlet or a fluid outlet into one of a plurality of fluid passageways formed through the rotary component. The rotary component further comprises a valve body rotatably receiving the rotary component therein. The valve body includes a five fluid ports formed therethrough with each of the fluid ports configured to be selectively aligned with one of the fluid openings of the rotary component depending on a rotational position of the rotary component relative to the valve body to allow the rotary valve to operate as a five-way switching valve.

13 Claims, 6 Drawing Sheets

(56) References Cited

U.S. PATENT DOCUMENTS

| | | | | |
|---|---|---|---|---|
| 7,131,460 B2* | 11/2006 | McLane | B60H 1/00485 |
| | | | 137/625.47 |
| 7,163,194 B2* | 1/2007 | Pervaiz | F16K 5/0478 |
| | | | 251/14 |
| 9,611,946 B1* | 4/2017 | Potter | F15B 13/0406 |
| 9,932,882 B2* | 4/2018 | Imasaka | F16K 31/041 |
| 10,788,135 B2* | 9/2020 | Whitaker | F16K 11/0853 |
| 2004/0221901 A1* | 11/2004 | Chen | F16K 11/0853 |
| | | | 137/625.23 |
| 2017/0363220 A1* | 12/2017 | Yan | F16K 27/107 |
| 2018/0292016 A1* | 10/2018 | Ledvora | F16K 11/0853 |
| 2018/0372235 A1* | 12/2018 | Smith | F16K 5/0471 |
| 2020/0049263 A1* | 2/2020 | Ozeki | F16K 5/181 |
| 2020/0173566 A1* | 6/2020 | Ozeki | F01P 7/165 |

* cited by examiner

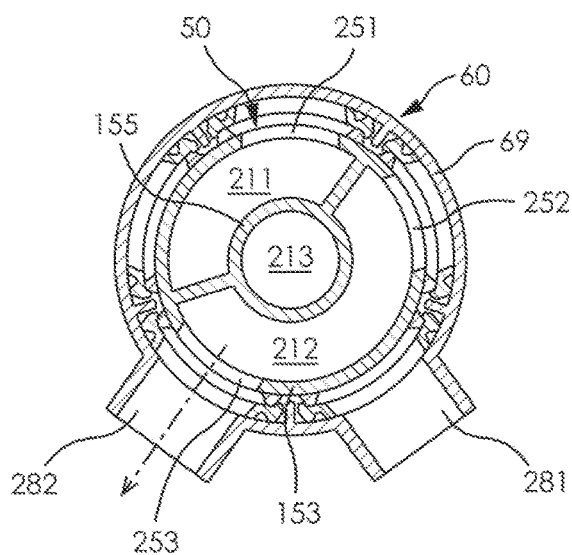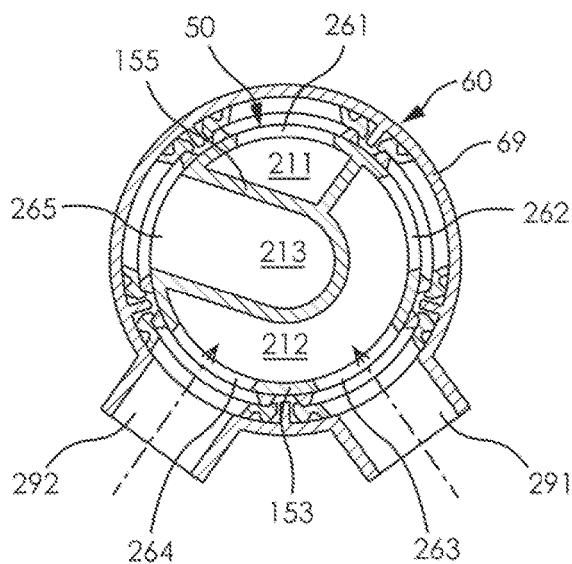
FIG. 9A    FIG. 9B
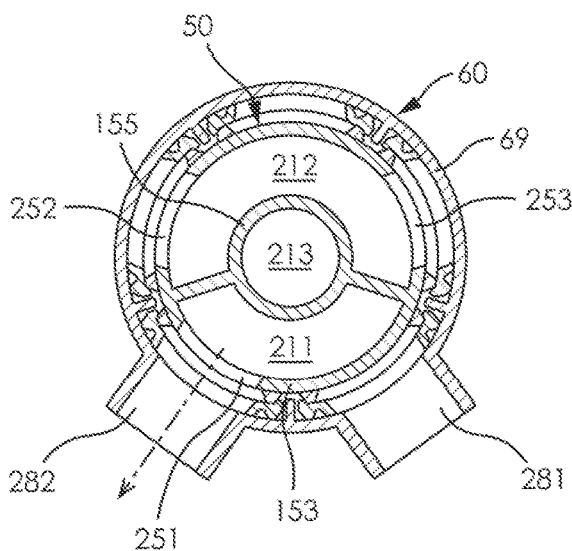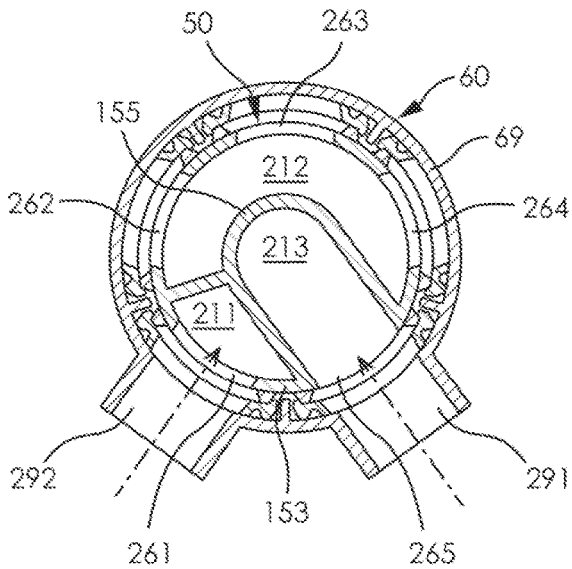
FIG. 10A    FIG. 10B

VARIABLE CYLINDER WALL FOR SEALS ON PLUG VALVE

CROSS-REFERENCE TO RELATED APPLICATION

This patent application claims priority to U.S. Provisional Patent Application Ser. No. 63/072,991 filed on Sep. 1, 2020, the entire disclosure of which is hereby incorporated herein by reference.

FIELD OF THE INVENTION

The invention relates to a rotary valve. More particularly, the rotary valve includes five different fluid ports to allow the rotary valve to be operational as a five-way switching valve. Additionally, the rotary valve includes a rotary component rotatable within a valve body, wherein the rotary component has a variable outer circumferential wall radius for creating variable sealing forces between the rotary component and the sealing elements associated with the valve body.

BACKGROUND

A plug valve typically includes a "plug" having a substantially cylindrical or conical outer surface that is received within a valve body having a corresponding cylindrical or conical inner surface. The plug typically includes at least one passageway formed therethrough with at least one of the ends of each of the passageways intersecting the outer surface of the plug. Each of the passageways is configured to communicate a fluid through the plug with respect to any of a variety of different flow configurations. The valve body in turn typically includes one or more ports intersecting the inner surface of the valve body in order to communicate the fluid between any combination of the ports of the valve body and the passageways of the plug. The plug is operatively connected to a rotary actuator configured to rotate the plug relative to the stationary valve body to cause a repositioning of each of the passageways relative to each of the stationary ports. Depending on the configuration of the plug and the valve body, such rotation of the plug relative to the valve body may switch which of the passageways are placed in fluid communication with the corresponding ports or may cease flow through at least one of the passageways by placing the at least one of the passageways in alignment with a portion of the inner surface of the valve body devoid of one of the ports.

The manner in which the plug rotates relative to the valve body requires that a suitable fluid-tight seal is established between the outer surface of the plug and the inner surface of the valve body to ensure that the corresponding fluid does not leak into a relatively small cylindrical or conical gap that may be present between the plug and valve body to allow for the ease of rotation of the plug relative to the valve body. Traditionally, such seals are established by placing a sealing element on the inner surface of the valve body around a periphery of each of the ports. Each of the sealing elements is typically compressed between the inner surface of the valve body and the outer surface of the plug to ensure that a suitable sealing effect is maintained regardless of the rotational position of the plug. Such sealing elements may be formed from elastomeric materials, hard plastic materials, or combinations of the two, for example.

Unfortunately, such sealing elements present a disadvantageous relationship wherein an increase in the sealing effect between the plug and the valve body also tends to increase the amount of torque required to rotate the plug relative to the valve body. This occurs because the amount of compression applied to such a sealing element in a radial direction of the plug valve relates directly to the sealing effect provided thereby. As the degree of compression is increased, a radial force present between an inner surface of the sealing element and the outer surface of the plug also increases. This increased radial force increases the frictional forces present between the sealing element and the outer surface of the plug with respect to a circumferential direction of the plug, which in turn increases the amount of torque required to overcome such frictional forces when rotating the plug relative to the valve body. Accordingly, the type of rotary actuator capable of supplying the desired degree of sealing effect for a given plug valve configuration may be limited to only those rotary actuators having a corresponding torque rating, which leads to such rotary actuators being more costly while also requiring greater power to operate in the desired manner.

One solution for minimizing the amount of torque that must be delivered to the plug for the desired rotation thereof is to reduce the friction present between the plug and each of the sealing elements associated with the ports of the valve body. This may be achieved by forming the engaging surface of the sealing element and/or the engaging surface of the plug from a relatively low friction material. However, such low friction materials often are cost prohibitive, require special and more complex manufacturing, or lack other properties such as having undesirable thermal expansion or corrosion resistance characteristics.

Accordingly, there exists a need in the art to produce a plug (rotary component) that can provide a desired degree of sealing effect to each of the associated sealing elements without requiring a corresponding increase in the amount of torque required to rotate the plug relative to the associated valve body.

Additionally, such plug valves of the prior art typically include only a limited number of possible configurations for prescribing flow configurations through the plug valve, such as a maximum of two or three suitable configurations. This greatly limits the ability of such plug valves to accommodate more complex flow configurations where one or more fluid streams must be routed to more than two or three possible flow paths. As a result, it may be necessary to incorporate multiple different valve elements at different locations within the corresponding fluid system or systems in order to achieve the desired flow configurations thereof. The use of additional valve elements increases the cost, complexity, and packaging space required to achieve such flow configurations.

Accordingly, there further exists a need in the art to produce a plug valve that is repositionable to a greater number of different flow configurations that can be utilized while maintaining the aforementioned fluid tight seal at each of the interactions between the plug and the valve body in order to minimize the cost, complexity, and packaging space of the plug valve.

SUMMARY OF THE INVENTION

According to an embodiment of the present invention, a rotary valve comprises a rotary component configured to rotate about an axis of rotation thereof. The rotary component includes a plurality of fluid openings formed at an exterior surface thereof with each of the fluid openings forming a fluid inlet or a fluid outlet into one of a plurality of fluid passageways formed through the rotary component. The rotary component further comprises a valve body rotatably receiving the rotary component therein. The valve body includes a plurality of fluid ports formed therethrough with each of the fluid ports configured to be selectively aligned with one of the fluid openings of the rotary component depending on a rotational position of the rotary component relative to the valve body.

BRIEF DESCRIPTION OF THE DRAWINGS

FIG. 9A is a cross-sectional view taken through the first tier of the rotary valve when the rotary valve operates in a third mode of operation;

FIG. 9B is a cross-sectional view taken through the second tier of the rotary valve when the rotary valve operates in the third mode of operation;

FIG. 10A is a cross-sectional view taken through the first tier of the rotary valve when the rotary valve operates in a fourth mode of operation; and FIG. 10B is a cross-sectional view taken through the second tier of the rotary valve when the rotary valve operates in the fourth mode of operation.

DETAILED DESCRIPTION OF THE INVENTION

Figure 1:
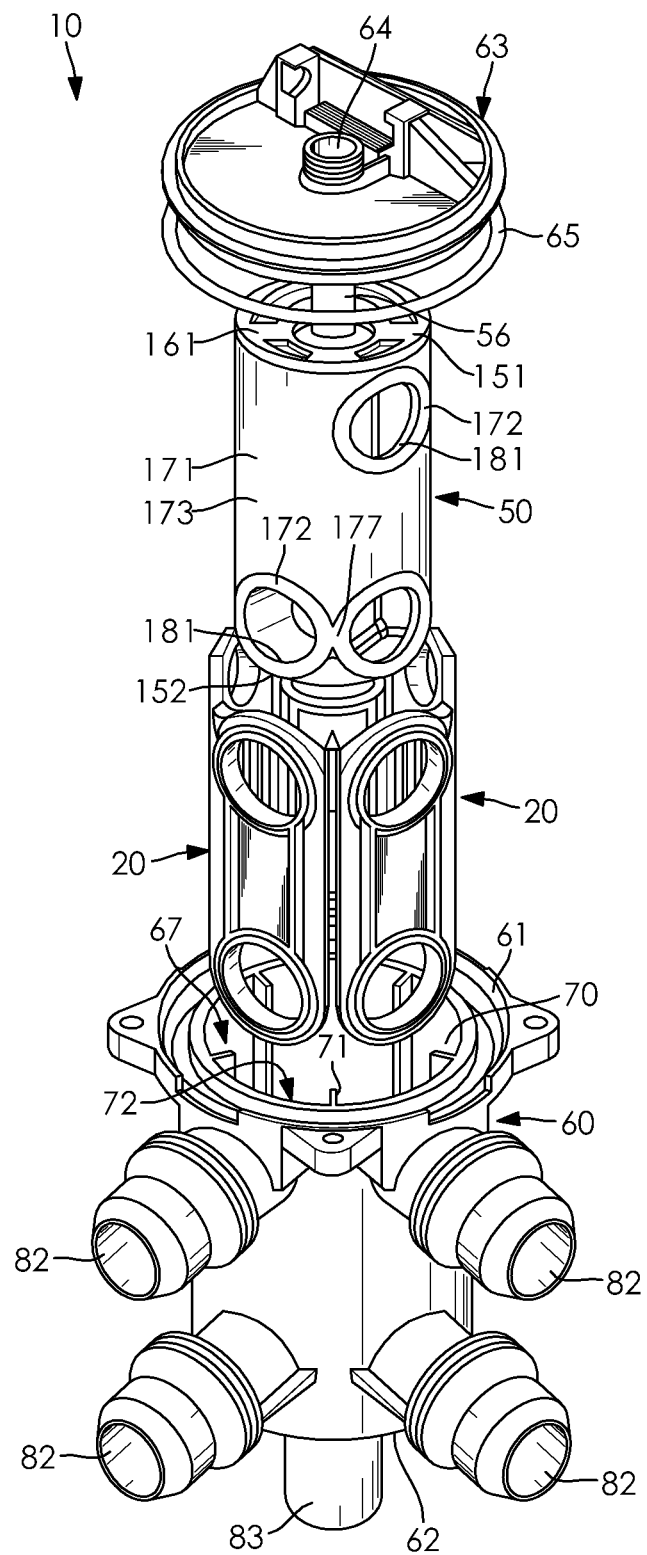
FIG. 1 is an exploded perspective view of a rotary valve according to an embodiment of the present invention.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. erms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

FIGS. 1-10 illustrate a rotary valve 10 utilizing a rotary component 50 (plug) according to an embodiment of the present invention. The rotary component 50 has a reduced frictional contact surface for decreasing the amount of torque necessary for rotating the rotary component 50 relative to a corresponding valve body 60. The illustrated rotary valve 10 may alternatively be referred to as a "plug valve," as desired.

Figure 6:
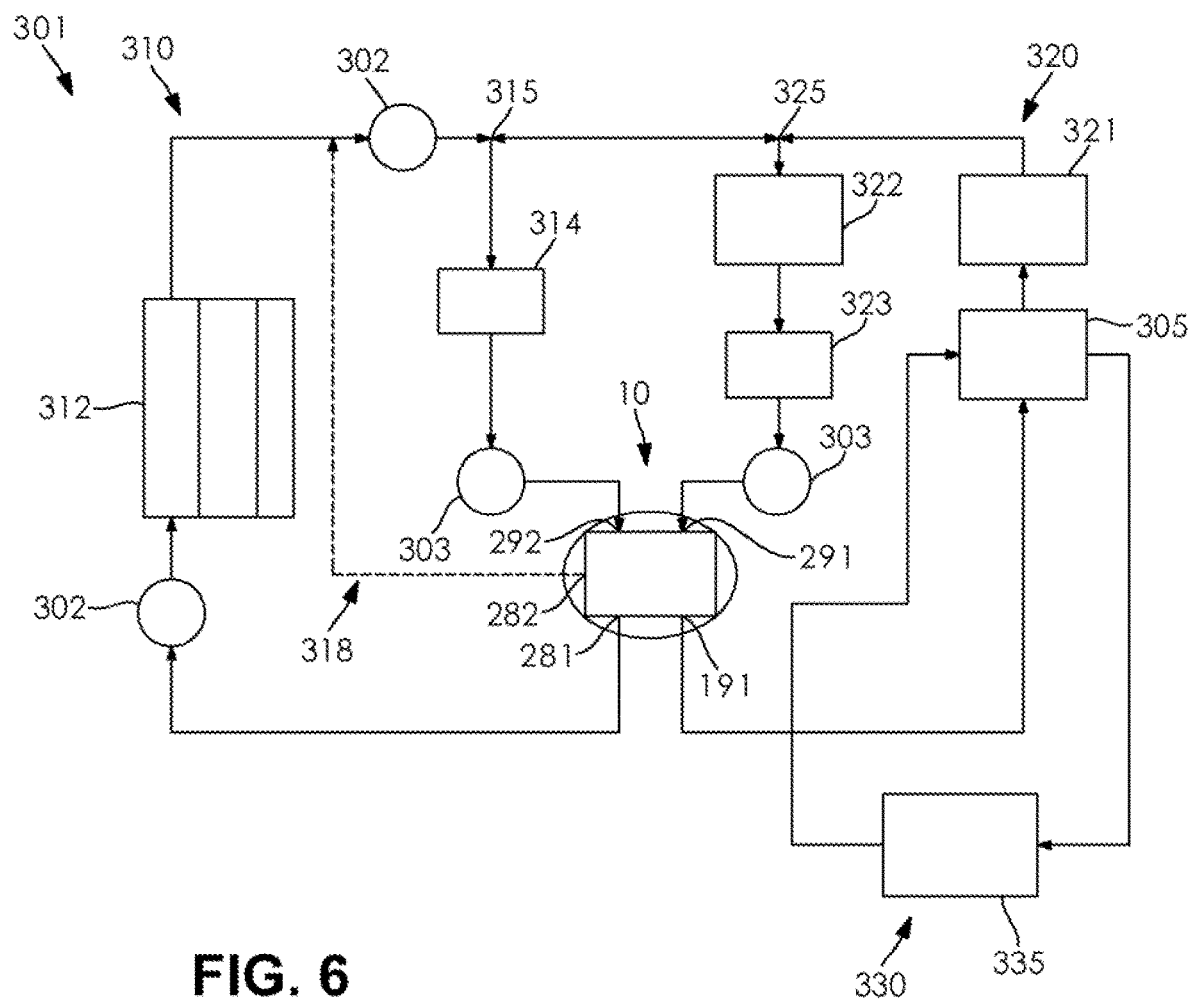
FIG. 6 is a schematic view of a fluid system utilizing the rotary valve.

The rotary valve 10 as shown and described herein may also be utilized for any number of different applications and for selectively conveying any variety of different fluids or combinations of fluids therethrough. The presently disclosed rotary valve 10 may be utilized in automotive applications, for example, including the control of various fluids associated with operation of a hydraulic system, a pneumatic system, a fuel system, a heating, ventilating, and air conditioning (HVAC) system, or a coolant system of the associated vehicle. The fluids suitable for use with the rotary valve 10 may be air, any hydraulic fluids, any types of fuel, any refrigerants, or any liquid coolants typically utilized with respect to such vehicular systems, as desired. However, it should also be apparent that the present rotary valve 10 may be adapted for use with any fluid associated with any fluid conveying system without necessarily departing from the scope of the present invention. FIG. 6 illustrates one exemplary application of the rotary valve 10 wherein the rotary valve 10 is utilized to control multiple different flows of a coolant (water) therethrough depending on the heating/cooling needs of various components of the associated motor vehicle.

The rotary valve 10 generally includes the rotary component 50, the valve body 60, and at least one sealing element 20 for providing a fluid-tight seal between the rotary component 50 and the valve body 60. The rotary component 50 and the valve body 60 are each substantially cylindrical in shape. The valve body 60 further includes a substantially cylindrical opening 67 formed therein for rotatably receiving the rotary component 50. However, it should be apparent that the beneficial features of the present invention may be maintained if the rotary component and a complimentary opening formed in the valve body include other substantially axially symmetric shapes. For example, the rotary component and the complimentary opening formed in the valve body may each include a truncated conical shape or a truncated ellipsoidal shape without necessarily departing from the scope of the present invention.

The rotary component 50 is configured to rotate relative to the valve body 60 about an axis of rotation thereof. The axis of rotation of the rotary component 50 extends through a center of the rotary component 50 and defines an axial direction thereof. The axis of rotation of the rotary component 50 also coincides with a central axis of the valve body 60 as well as a central axis of the rotary valve 10 more generally, hence subsequent references to an axial direction of any of the rotary valve 10, the rotary component 50, or the valve body 60 refer to directions arranged parallel to the axis of rotation of the rotary component 50. Additionally, a radial direction of any one of the rotary valve 10, the rotary component 50, or the valve body 60 may refer to any of the directions passing through and arranged perpendicular to the axis of rotation of the rotary component 50.

The rotary component 50 is operably coupled to a rotary motor or actuator (not shown) configured to provide a torque necessary to rotate the rotary component 50 about the axis of rotation thereof relative to the stationary valve body 60. The rotary motor or actuator may be a torque motor, a servo motor, an electric stepper motor, or a brushless DC motor, as non-limiting examples. Any rotary motor or actuator having the necessary torque and the precision for establishing a desired rotational position of the rotary component 50 relative to the valve body 60 may be selected without departing from the scope of the present invention.

Figure 2:
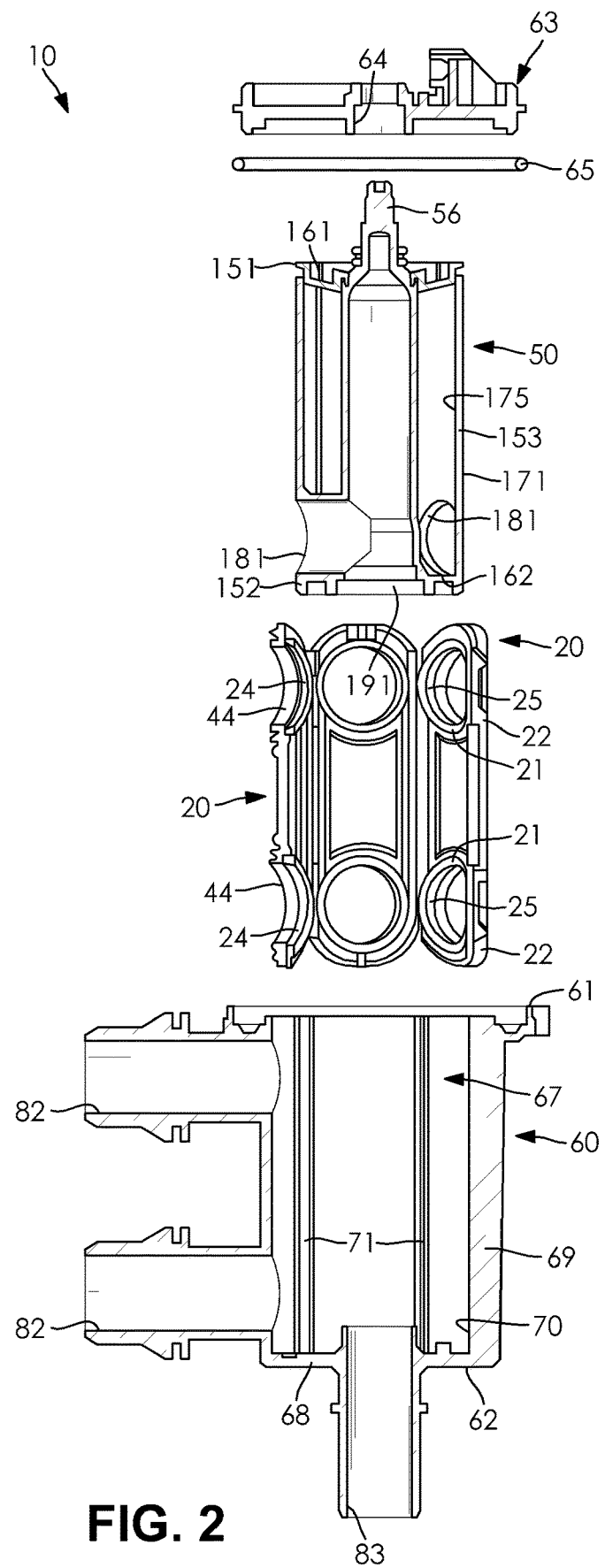
FIG. 2 is an exploded elevational cross-sectional view of the rotary valve taken through an axis of rotation of the rotary valve.

The rotary component 50 extends axially from a first end 151 to a second end 152 thereof. A first end wall 161 extends substantially perpendicular to the axial direction of the rotary component 50 adjacent the first end 151 thereof and a second end wall 162 extends substantially perpendicular to the axial direction of the rotary component 50 adjacent the second end 152 thereof. As shown in FIGS. 1 and 2, the rotary component 50 may include a stem 56 extending from the first end 151 thereof for operationally engaging the corresponding rotary motor or actuator of the rotary valve 10. The rotary component 50 further includes a cylindrically shaped circumferential wall 153 extending between the first and second end walls 161, 162. The circumferential wall 153 includes an outer circumferential surface 171 facing radially outwardly towards a surrounding portion of the valve body 60 and an inner circumferential surface 175 facing radially inwardly towards the axis of rotation of the rotary component 50.

The rotary component 50 defines a plurality of fluid passageways 211, 212, 213 therethrough. Each of the fluid passageways 211, 212, 213 provides fluid communication between two or more fluid openings 181, 191 formed at an outer or exterior surface of the rotary component 50. Specifically, the fluid openings 181, 191 include eight circumferential fluid openings 181 extending through the circumferential wall 153 to the outer circumferential surface 171 thereof and a single axial fluid opening 191 extending through the second end wall 162 to the second end 152 of the rotary component 50. Depending on the instantaneous mode of operation of the rotary valve 10, each of the fluid openings 181, 191 may represent an inlet or an outlet into the corresponding fluid passageway 211, 212, 213. A specific arrangement of the fluid openings 181, 191 relative to the fluid passageways 211, 212, 213 is explained in detail hereinafter when describing the different possible modes of operation of the rotary valve 10.

Figure 4:
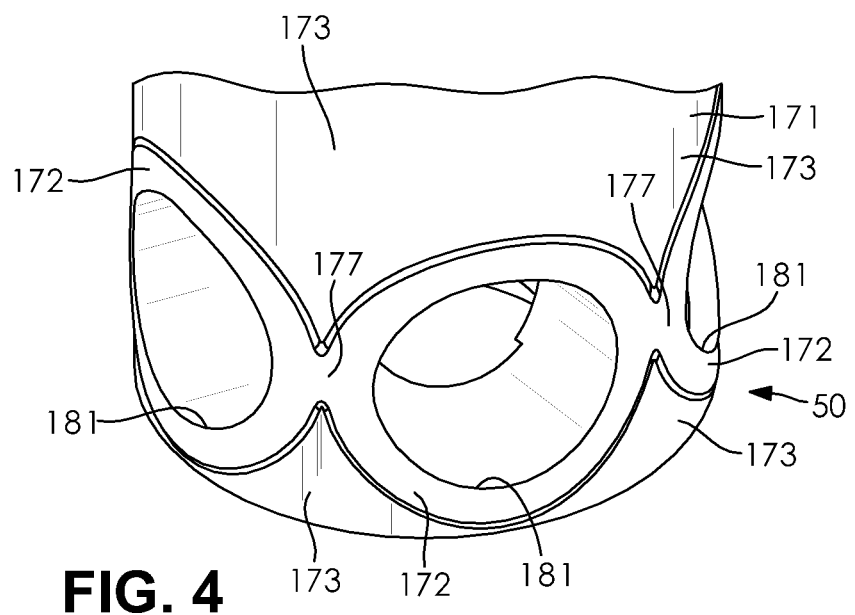
FIG. 4 is a fragmentary enlarged perspective view of a rotary component of the rotary valve showing a variable radius of an outer circumferential surface of the rotary component.

As best shown in FIG. 4, the outer circumferential surface 171 of the circumferential wall 153 is subdivided into at least one sealing zone 172 and at least one non-sealing zone 173, wherein each of the circumferential fluid openings 181 is formed along the outer circumferential surface 171 at a position corresponding to one of the sealing zones 172. As a result, an entirety of a perimeter of each of the circumferential fluid openings 181 is surrounded by a corresponding one of the sealing zones 172 while each of the non-sealing zones 173 is spaced apart from a perimeter of each of the circumferential fluid openings 181.

Each of the sealing zones 172 forms a portion of the outer circumferential surface 171 configured to sealingly engage one of the sealing elements 20 with a first sealing force when the rotary component 50 is rotated to one of a plurality of operational positions thereof, including both the operational positions wherein the corresponding circumferential fluid opening 181 is communicating a fluid therethrough and the operational positions wherein the corresponding circumferential fluid opening 181 is not communicating the fluid therethrough. In contrast, each of the non-sealing zones 173 refers to a portion of the outer circumferential surface 171 that is not directly surrounding one of the circumferential fluid openings 181 and therefore is not in need of direct sealing to one of the sealing elements 20 when the rotary valve 10 is actuated to one of the plurality of the operational positions thereof. Accordingly, each of the non-sealing zones 173 is configured to engage one of the sealing elements 20 with a second sealing force that is less than the first sealing force. The first sealing force may alternatively be referred to as a maximum sealing force while the second sealing force may alternatively be referred to as a minimum sealing force, as desired.

The sealing zones 172 and the non-sealing zones 173 are distinguished from each other by a difference in a radius of the outer circumferential surface 171 along each of the identified zones 172, 173 as measured from the axis of rotation of the rotary component 50. Specifically, each of the sealing zones 172 may include a first radius while each of the non-sealing zones 173 may include a second radius that is smaller than the first radius. The first radius may be representative of a maximum radius of the outer circumferential surface 171 configured to engage one of the sealing elements 20 while the second radius may be representative of a minimum radius of the outer circumferential surface 171 configured to engage one of the sealing elements 20. The sealing zones 172 may accordingly be referred to alternatively as large radius zones 172 of the outer circumferential surface 171 while the non-sealing zones 173 may accordingly be referred to alternatively as small radius zones 173 of the outer circumferential surface 171.

Figure 5:
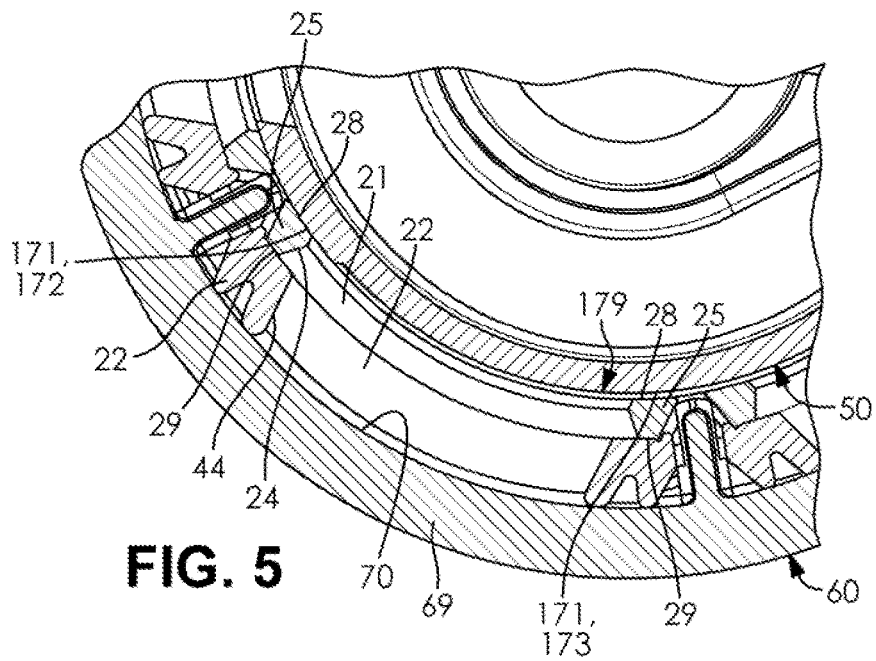
FIG. 5 is an enlarged fragmentary cross-sectional view showing an interaction between the rotary component, a valve body, and a sealing element of the rotary valve.

FIG. 5 illustrates the transition of the outer circumferential surface 171 from one of the sealing zones 172 having the first (maximum) radius to one of the non-sealing zones 173 having the second (minimum) radius. FIG. 5 further illustrates a radial gap 179 formed between the non-sealing zone 173 and a facing radially innermost surface of one of the sealing elements 20. The sealing elements 20 are configured to engage the outer circumferential surface 171 along both the sealing zones 172 and the non-sealing zones 173 due to the sealing elements 20 being dimensioned to be compressed between the rotary component 50 and the valve body 60 regardless of the rotational position of the rotary component 50, hence the illustrated gap 179 is not actually present during operational use of the rotary valve 10. The gap 179 is shown merely to illustrate the difference in radial compression of each of the sealing elements 20 depending on whether the corresponding portion of each of the sealing elements 20 is compressed between the valve body 60 and one of the sealing zones 172 or between the valve body 60 and one of the non-sealing zones 173. The radial gap 179 is representative of a reduction in the radial distance the corresponding portion of the sealing element 20 must be radially compressed when sandwiched between the rotary component 50 and the valve body 60. This reduction is radial compression results in the reduced sealing force present at each of the non-sealing zones 173.

Each of the sealing zones 172 may be offset outwardly along the outer circumferential surface 171 from the periphery of the corresponding circumferential fluid opening 181 by a suitable distance for forming the sealing engagement with the instantaneously aligned one of the sealing elements 20. In the illustrated example, the circular perimeter shape of each of the circumferential fluid openings 181 results in each of the sealing zones 172 having a similarly circular perimeter shape that is enlarged relative to the circular perimeter shape of the corresponding circumferential fluid opening 181 by the constant offset distance. The offset distance may correspond to a dimension of the engaging sealing element 20 radially aligned with the corresponding sealing zone 172 to ensure a desired engagement between the sealing zone 172 and the engaging surface of the sealing element 20. For example, each of the sealing zones 172 may be offset outwardly about 3 mm from the periphery of the corresponding circumferential fluid opening 181 to maintain engagement with an aligned one of the sealing elements 20, as one non-limiting example.

As can be seen in FIG. 4, the position and size of each of the circumferential fluid openings 181 as well as the size of the offset of the periphery of each of the sealing zones 172 may result in some of the sealing zones 172 intersecting and hence merging with an adjacent one of the sealing zones 172 with respect to the circumferential direction of the rotary component 50. Such merging may occur in what is hereinafter referred to as one of the transition zones 177 of the outer circumferential surface 171. In the illustrated embodiment, the transition zones 177 are formed by portions of the outer circumferential surface 171 disposed between adjacent ones of the circumferential fluid openings 181. The merging of the adjacent sealing zones 172 at each of the transition zones 177 ensures that the first sealing force is applied to at least a portion of each of the merged sealing zones 172 during a rotational transition of the rotary component 50 from one operational position to another. Although not shown herein, it should be apparent that the sealing zones 172 may also merge in the axial direction of the rotary valve 10 to similarly form the transition zones 177 depending on the size of the offset and the axial spacing present between the adjacent circumferential fluid openings 181.

As explained in detail hereinafter, the circumferential fluid openings 181 of the illustrated embodiment are provided in two different tiers that are spaced axially apart from one another. As such, the non-sealing zones 173 may extend along those axial positions of the outer circumferential surface 171 devoid of one of the tiers of the circumferential fluid openings 181, such as those portions of the outer circumferential surface 171 disposed between the axially spaced apart tiers of the circumferential fluid openings 181 or the axial end portions of the outer circumferential surface 171 disposed axially beyond each of the tiers of the circumferential fluid openings 181.

The presence of both the sealing zones 172 and the non-sealing zones 173 within the outer circumferential surface 171 distinguishes the rotary component 50 from similar rotary components (plugs) of the rotary valves of the prior art. Specifically, an outer circumferential surface of each of the rotary components of the prior art typically includes no differentiation between a radius of the outer circumferential surface depending on the presence of any circumferential fluid openings formed therein. For example, the cylindrical rotary components of the prior art typically include a constant radius across an entirety of the outer circumferential surface regardless of the presence of one or more circumferential fluid openings intersecting the outer circumferential surface. As such, there exists no structural feature for reducing the radial sealing force applied to the outer circumferential surface in order to reduce the frictional forces present between the outer circumferential surface and any engaging sealing elements.

Although the rotary component 50 is described hereinafter as having a specific configuration relative to the valve body 60 for achieving multiple beneficial modes of operation of the rotary valve 10, it should be apparent that the general concept regarding the change in radius between the sealing zones 172 and the non-sealing zones 173 depending on the position of each of the corresponding circumferential fluid openings 181 may be utilized in a variety of different rotary valve configurations without necessarily departing from the scope of the present invention. For example, the rotary component 50 may include substantially any number and arrangement of the circumferential fluid openings 181 contrary to that shown and described herein while still appreciating the benefits of varying the radius of the outer circumferential surface 171 into the sealing zones 172 and the non-sealing zones 173. Additionally, it should also be apparent that the benefits of the change in radius of the outer circumferential surface 171 between the sealing zones 172 and the non-sealing zones 173 may also be appreciated when the rotary valve 10 utilizes any radially compressible sealing assembly or sealing element in addition to the sealing elements 20 as shown and described herein.

Referring back to FIGS. 1 and 2, the valve body 60 extends axially from a first end 61 to a second end 62 thereof. The first end 61 of the valve body 60 is configured to receive a cover 63 after the valve body 60 has axially received the rotary component 50 and each of the corresponding sealing elements 20 therein. The cover 63 includes an opening 64 centered on the axis of rotation of the rotary component 50 with the opening 64 configured to receive the stem 56 of the rotary component 50 therethrough. An O-ring 65 is disposed between the first end 61 of the valve body 60 and an inner axial surface of the cover 63 to form a fluid-tight seal therebetween. Another pair of O-rings (not shown) may be received between an inner circumferential surface of the cover 63 defining the opening 64 thereof and an outer circumferential surface of the stem 56 of the rotary component 50 to form a fluid-tight seal therebetween, including during periods of rotation of the rotary component 50 relative to the valve body 60.

The opening 67 of the valve body 60 defines each of an axial end wall 68 and a circumferential wall 69 of the valve body 60. The axial end wall 68 is configured to engage an axial end of the rotary component 50 and the circumferential wall 69 is configured to surround the rotary component 50 when the rotary component 50 is rotatably received within the valve body 60.

The circumferential wall 69 of the valve body 60 includes an inner circumferential surface 70 extending peripherally around the rotary component 50. A plurality of support elements 71 extend radially inwardly from the inner circumferential surface 70 towards the axis of rotation of the rotary component 50. The support elements 71 are circumferentially spaced apart from each other by equal 72 degree angular intervals as measured from the axis of rotation of the rotary component 50. A pocket 72 is formed circumferentially between each adjacent pair of the support elements 71. Each of the pockets 72 is shaped to receive one of the sealing elements 20 therein. The pockets 72 may include various surface features for establishing and maintaining a position of a corresponding one of the sealing elements 20 therein during rotation of the rotary component 50 relative to the stationary valve body 60.

The valve body 60 further defines a plurality of fluid ports 82, 83 therethrough. Each of the fluid ports 82, 83 provides fluid communication between a component of an associated fluid system disposed external to the rotary valve 10 (such as those shown in FIG. 6) and one of the fluid passageways 211, 212, 213 formed through the interior of the rotary component 50. Specifically, the fluid ports 82, 83 include four circumferential fluid ports 82 extending radially through the circumferential wall 69 to the inner circumferential surface 70 thereof and one axial fluid port 83 extending through the axial end wall 68 to the interior of the valve body 60 as defined by the opening 67. Each of the circumferential fluid ports 82 is configured for selective fluid communication with one of the circumferential fluid openings 181 of the rotary component 50 depending on the rotational position of the rotary component 50 relative to the valve body 60. The axial fluid port 83 is aligned with and in fluid communication with the axial fluid opening 191 of the rotary component 50 along an axis coinciding with the axis of rotation of the rotary component 50. The specific arrangement of the fluid ports 82, 83 is described in detail when discussing the different modes of operation of the rotary valve 10.

FIGS. 1, 2, and 5 best illustrate the features of each of the sealing elements 20. Each of the sealing elements 20 includes a first sealing structure 21 and a second sealing structure 22. The first sealing structure 21 may alternatively be referred to as the "hard" sealing structure 21 while the second sealing structure 22 may alternatively be referred to as the "soft" sealing structure 22, as desired. The hard sealing structure 21 is configured to directly engage the outer circumferential surface 171 of the rotary component 50 to provide a fluid-tight seal therebetween when the rotary component 50 is rotated to any of the different prescribed positions thereof for causing any of the prescribed flow configurations through the rotary valve 10. More specifically, the hard sealing structure 21 is configured to engage one of the sealing zones 172 or one of the non-sealing zones 173 depending on the operational position of the rotary component 50. In contrast, the soft sealing structure 22 is configured to directly engage the circumferential wall 69 of the valve body 60 within one of the pockets 72 thereof. At least one of the soft sealing structures 22 is configured to surround and form a fluid-tight seal around a periphery of the radial innermost end of a corresponding one of the circumferential fluid ports 82 of the valve body 60. Additionally, the hard sealing structure 21 is also configured to engage the soft sealing structure 22 to form a fluid-tight seal therebetween at positions where the sealing structures 21, 22 are placed in direct contact with each other. As such, the sealing element 20 is configured to provide a fluid-tight seal between the instantaneously aligned one of the circumferential fluid openings 181 formed through the rotary component 50 and the radial innermost end of the circumferential fluid port 82 corresponding to the position of the sealing element 20 within the valve body 60. However, it should be apparent to one skilled in the art that alternative configurations of the corresponding sealing elements 20 may be utilized for maintaining the beneficial relationship between each of the sealing elements 20 and the outer circumferential surface 171 of the rotary component 50 as described hereinafter. For example, each of the sealing elements may be formed exclusively from a resiliently compressible (soft) material, such as an elastomeric material, in the absence of an adjoining rigid (hard) material, as desired.

Each of the hard sealing structures 21 includes a pair of axially spaced apart peripheral portions 25. Each of the peripheral portions 25 defines a cylindrically shaped flow opening 24 therethough that is substantially circular in perimeter shape when viewed from the radial direction of the rotary valve 10. Each of the flow openings 24 includes a perimeter size and shape substantially corresponding to that of any of the circumferential fluid openings 181 formed through the rotary component 50. As shown in FIG. 5, each of the peripheral portions 25 further includes a radial inner surface 28 and a radial outer surface 29. The radial inner surface 28 is configured to sealingly engage the outer circumferential surface 171 of the rotary component 50 along one of the sealing zones 172 or along one of the non-sealing zones 173, depending on the operational position of the rotary component 50 relative to the valve body 60. The radial outer surface 29 is configured to bear against the soft sealing structure 22 with respect to the radial direction of the rotary component 50.

The hard sealing structure 21 is formed from a substantially rigid material such as a relatively rigid and relatively hard thermoplastic material. More specifically, the selected material may desirably be a semi-crystalline thermoplastic. If a thermoplastic material is utilized, the thermoplastic material may preferably be polyphthalamide (PPA) or polyphenylene sulfide (PPS). It may be preferable to utilize either of PPA or PPS due to each of the materials having a relatively strong chemical resistance, heat resistance, and resistance to permanent deformation or abrasion. Additionally, each of PPA and PPS can be provided as thermoplastic resins that are capable of being injection molded for forming the above described shape and configuration of the hard sealing structure 21 using a relatively inexpensive manufacturing process while remaining within the desired tolerances for establishing the desired sealing engagement with the outer circumferential surface 171 of the rotary component 50. Other rigid thermoplastic materials may be utilized for forming the hard sealing structure 21, such as polytetrafluoroethylene (PTFE), although PTFE is incapable of being manufactured using an injection molding process, hence a more expensive and difficult manufacturing process is required to properly form the hard sealing structure 21 to the desired configuration for providing the fluid-tight seal with the outer circumferential surface 171 of the rotary component 50. Additional rigid materials may also be utilized for forming the hard sealing structure 21 as well, including various metals, various ceramics, carbon graphite, and even glass, depending on the application specific requirements for the associated rotary valve 10. However, once again, such alternative materials other than the preferable thermoplastic materials listed above may be cost prohibitive or increasingly difficult to manufacture within the desired tolerances for maintaining the fluid-tight seal between the hard sealing structure 21 and the rotary component 50.

The rotary component 50, and specifically the portion of the rotary component 50 forming the outer circumferential surface 171 thereof, may be formed from the same materials described as being suitable for forming the hard sealing structure 21. For example, the rotary component 50 may be formed from a rigid thermoplastic material such as PPA or PPS, as non-limiting examples. In some embodiments, the same material may be selected to form each of the rotary component 50 and the hard sealing structure 21. However, any rigid material may be selected to form the rotary component 50 without necessarily departing from the scope of the present invention.

Each of the soft sealing structures 22 has a shape substantially complimentary to that of each of the pockets 72 formed in the valve body 60. The soft sealing structures 22 are received within a corresponding one of the pockets 72 in a manner preventing motion of each of the soft sealing structures 22 in the radial or circumferential directions of the valve body 60. Each of the soft sealing structures 22 includes a pair of axially spaced apart flow openings 44 formed therethrough. Each of the flow openings 44 is cylindrical in shape and extends through the corresponding soft sealing structure 22 in the radial direction of the rotary valve 10. Each of the flow openings 44 includes a circular perimeter shape when viewed in the radial direction of the rotary valve 10. Each of the flow openings 44 includes a slightly reduced radius relative to each of the flow openings 24 formed through the hard sealing structure 21 to ensure that the radial outer surface 29 of the hard sealing structure 21 bears against the soft sealing structure 22.

As suggested by the given names, the hard sealing structure 21 is formed from a material that is harder and stiffer than the material selected for forming the soft sealing structure 22. More specifically, the soft sealing structure 22 is formed from a relatively soft material that is resiliently deformable. As used herein, a resiliently deformable material is a material that can be deformed in such a way that the material attempts to return to its original position following deformation thereof, and especially when the material is compressed to be reduced in dimension in a given direction. The resiliency of the material selected for the soft sealing structure 22 should be such that the material applies a radial spring force to the hard sealing structure 21 in response to the soft sealing structure 22 being compressed in the radial direction towards the circumferential wall 69. The resiliently deformable material may preferably be an elastomeric material such as Santoprene® thermoplastic elastomer, ethylene propylene diene monomer (EPDM) rubber, Nylabond® thermoplastic elastomer, EPDM foam, silicone rubber, nitrile, or urethane, as non-limiting examples. The elastomeric material may be selected based on the type of fluid and operating characteristics of the fluid being communicated through the rotary valve 10, such as including a desired chemical resistance and heat resistance. In a preferred embodiment, the elastomeric material may be selected to be a low durometer, 35-45 shore A, soft seal rubber to provide a low spring force to displacement ratio with respect to the soft sealing structure 22. The use of the low durometer material also aids in addressing concerns relating to tolerance stack-up in any given direction, including the radial direction of the rotary valve 10, because the low spring force to displacement ratio allows for larger and more manufacturing friendly tolerances to be used in forming each of the sealing elements 20.

The rigid material forming the hard sealing structure 21 is selected to include a lower co-efficient of friction than the resilient and soft material selected for forming the soft sealing structure 22. As such, the rotation of the rotary component 50 via the corresponding rotary motor or actuator requires less torque to overcome the frictional forces present between the radial inner surface 28 of the hard sealing structure 21 and the outer circumferential surface 171 of the rotary component 50 than would be the case if the soft sealing structure 22 were placed in direct contact with the rotary component 50 during the rotation thereof.

When the rotary valve 10 is in the fully assembled position, each of the flow openings 24 formed through one of the hard sealing structures 21 cooperates with one of the flow openings 44 formed through the corresponding soft sealing structure 22 to provide fluid communication between one of the circumferential fluid openings 181 formed through the rotary component 50 and an aligned one of the circumferential fluid ports 82 formed through the valve body 60. Each of the sealing elements 20 having the corresponding fluid passing therethrough establishes the necessary fluid-tight seals for preventing any leakage of the fluid outside of the desired flow path of the fluid. The rotary actuator or motor can rotate the rotary component 50 to any of a variety of different rotational positions relative to the valve body 60 with each of the sealing elements 20 maintaining the fluid-tight sealing effect both during and after the rotation of the rotary component 50 due to the continuous spring force applied by each of the soft sealing structures 22 to the corresponding hard sealing structures 21.

A more thorough description of the structure of each of the sealing elements 20 is found in co-pending U.S. patent application Ser. No. 16/939,270 to Graichen, which is hereby incorporated herein by reference in its entirety.

Figure 3:
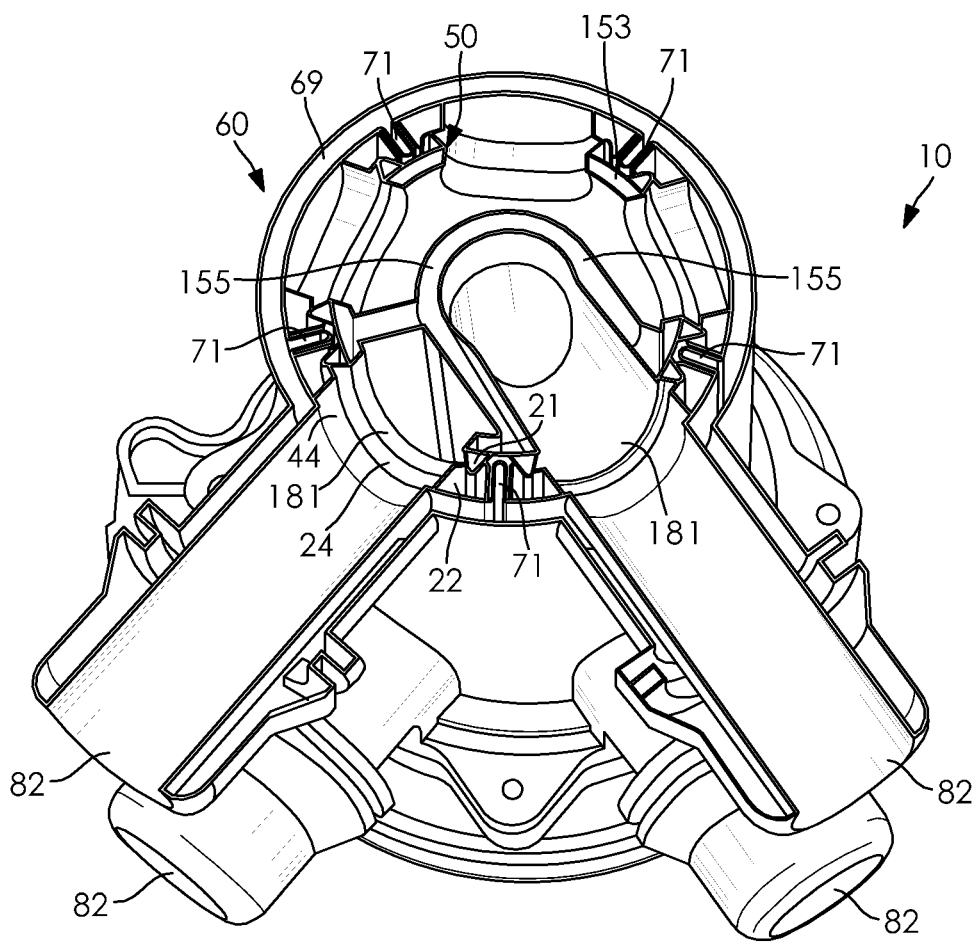
FIG. 3 is a bottom perspective cross-sectional view of the rotary valve taken through one of a pair of tiers of the rotary valve.

Referring now to FIGS. 7A-10B, the specific configurations of the rotary component 50 and the valve body 60 for achieving the different modes of operation of the rotary valve 10 are shown and described. As can be seen in FIGS. 1-3, the rotary valve 10 generally includes a two-tiered configuration with each of the two tiers spaced apart from one another with respect to the axial direction of the rotary valve 10. A first tier includes a first set of the circumferential fluid openings 181, a first set of the flow openings 24, 44 (as formed by the structures 21, 22 of each of the sealing elements 20), and a first set of the circumferential fluid ports 82 all arranged on a first plane. The first plane is arranged perpendicular to the axial direction of the rotary valve 10 and is disposed towards the first end 151 of the rotary component 50 when the rotary valve 10 is fully assembled. A second tier includes a second set of the circumferential fluid openings 181, a second set of the flow openings 24, 44, and a second set of the circumferential fluid ports all arranged on a second plane. The second plane is similarly arranged perpendicular to the axial direction of the rotary valve 10 and is axially spaced from the first plane having the first tier towards the second end 152 of the rotary component 50 when the rotary valve 10 is fully assembled.

Figure 7A:
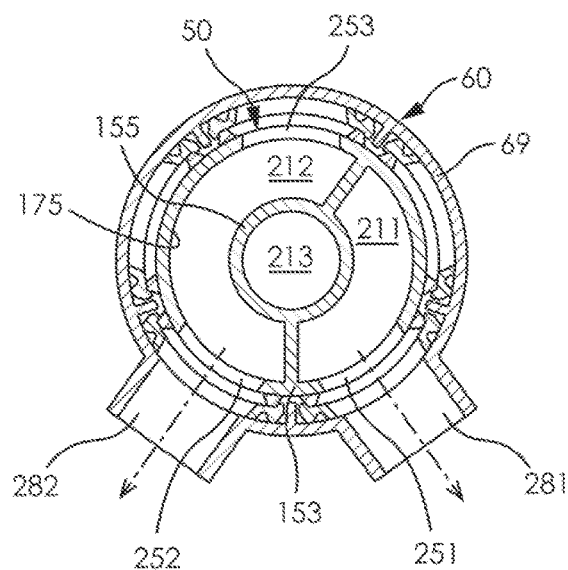
FIG. 7A is a cross-sectional view taken through a first tier of the rotary valve when the rotary valve operates in a first mode of operation.
Figure 7B:
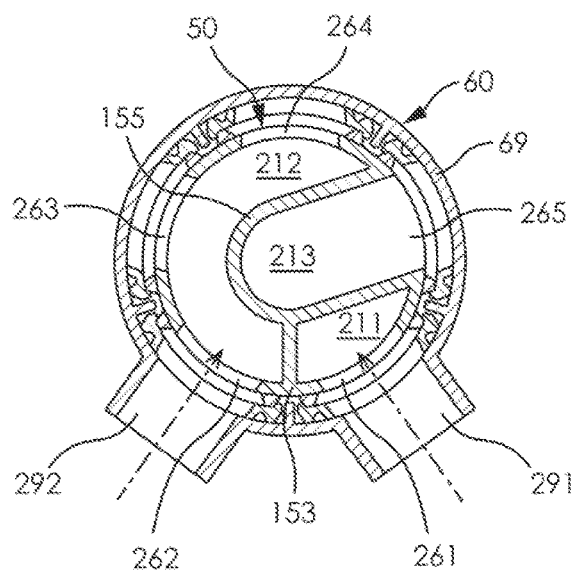
FIG. 7B is a cross-sectional view taken through a second tier of the rotary valve when the rotary valve operates in the first mode of operation.
Figure 8A:
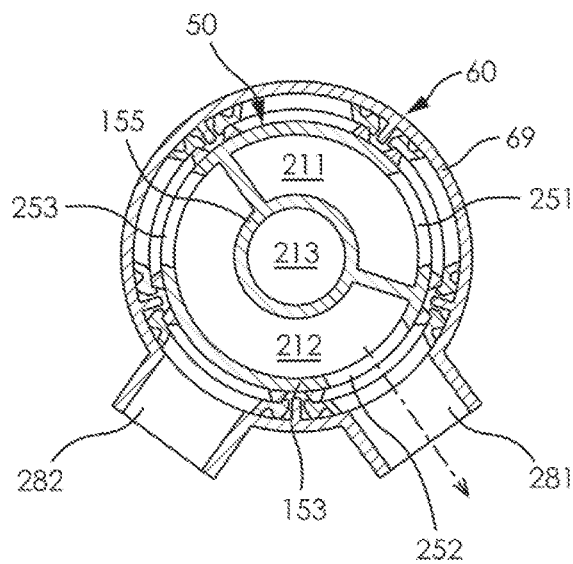
FIG. 8A is a cross-sectional view taken through the first tier of the rotary valve when the rotary valve operates in a second mode of operation.
Figure 8B:
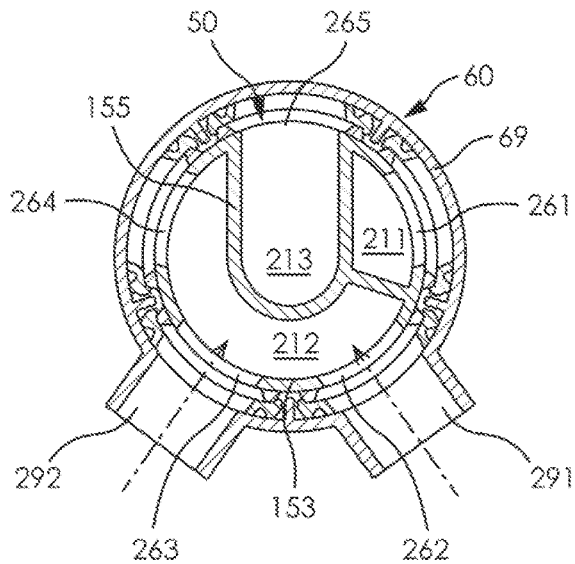
FIG. 8B is a cross-sectional view taken through the second tier of the rotary valve when the rotary valve operates in the second mode of operation.

Each of FIGS. 7A, 8A, 9A, and 10A show cross-sections through the first tier (first plane) of the rotary valve 10 while each of FIGS. 7B, 8B, 9B, and 10B show cross-sections through the second tier (second plane) of the rotary valve 10 with respect to four potential modes of operation of the rotary valve 10. FIGS. 7A and 7B show the two tiers when the rotary valve 10 is operating in a first mode of operation, FIGS. 8A and 8B show the two tiers when the rotary valve 10 is operating in a second mode of operation, FIGS. 9A and 9B show the two tiers when the rotary valve 10 is operating in a third mode of operation, and FIGS. 10A and 10B show the two tiers when the rotary valve 10 is operating in a fourth mode of operation. The four different modes of operation include the potential for fluid communication between combinations of five different fluid ports 82, 83 formed through the valve body 60, hence the rotary valve 10 may be referred to as a five-way valve or five-way switching valve.

As can be seen throughout FIGS. 7A-10B, the cylindrically shaped rotary valve 10 can generally be subdivided into five different 72 degree sectors of a circle with each of the sectors including one of the sealing elements 20 disposed within one of the pockets 72 of the valve body 60. Each of the sectors of the circle further corresponds to a potential position of one of the circumferential fluid openings 181 formed at the outer circumferential surface 171 of the rotary component 50. Similarly, each of the circumferential fluid ports 82 corresponds in position to one of the sectors of the circle, wherein the pair of the circumferential fluid ports 82 of a common tier are disposed in adjacent ones of the sectors. The two adjacent sectors including the circumferential fluid ports 82 of the first tier also coincide with the two adjacent sectors including the circumferential fluid ports 82 of the second tier such that each of the circumferential fluid ports 82 of the first tier is aligned with and spaced apart from a corresponding one of the circumferential fluid ports 82 of the second tier with respect to the axial direction of the rotary valve 10.

This division of the rotary valve 10 into five different sectors generally results in the different analogous features forming the rotary valve 10 being separated angularly from each other by 72 degree increments with respect to the circumferential direction of the rotary valve 10. Specifically, the circumferential wall 153 of the rotary component 50 may be divided into five equal circumferential segments with each of the circumferential segments extending through an arc of 72 degrees as measured from the axis of rotation of the rotary component 50. Similarly, the circumferential wall 69 of the valve body 60 may be divided into five equal circumferential segments with each of the circumferential segments once again extending through an arc of 72 degrees as measured from the axis of rotation of the rotary component 50.

As such, the rotary component 50 is configured to be rotated in 72 degree increments to radially align a desired one of the circumferential fluid openings 181 with a desired one of the circumferential fluid ports 82 of that same tier to provide fluid communication therebetween (via a radially aligned set of the flow openings 24, 44 formed through a corresponding one of the sealing elements 20). The two different tiers of the rotary valve 10 then communicate the corresponding fluid axially through the interior of the rotary component 50 via the different fluid passageways 211, 212, 213 formed therein to achieve the different modes of operation of the rotary valve 10.

Referring now to FIG. 7A, the first tier of the rotary valve 10 includes the rotary component 50 having a first circumferential fluid opening 251, a second circumferential fluid opening 252, and a third circumferential fluid opening 253. The position of the first circumferential fluid opening 251 of the first tier corresponds to a first circumferential segment of the circumferential wall 153, which is located towards the lower right corner of FIG. 7A. The remaining circumferential segments of the circumferential wall 153 are formed in succession with respect to a first circumferential direction of the rotary component 50 (clockwise with respect to the perspective of FIG. 7A), wherein the second circumferential segment is disposed adjacent the first circumferential segment, the third circumferential segment is disposed adjacent the second circumferential segment, the fourth circumferential segment is disposed adjacent the third circumferential segment, and the fifth circumferential segment is disposed adjacent the fourth circumferential segment (as well as the first circumferential segment at a position opposite the fourth circumferential segment). Based on this convention, the second circumferential fluid opening 252 of the first tier is positioned to correspond to the second circumferential segment while the third circumferential fluid opening 253 of the first tier is positioned to correspond to the fourth circumferential segment. The remaining third circumferential segment and fifth circumferential segment are each devoid of one of the circumferential fluid openings 181, and are instead occupied by continuous portions (arcs) of the circumferential wall 153 preventing a radial flow of any fluid into or out of the rotary component 50.

Referring now to FIG. 7B while utilizing the same naming convention of the circumferential segments of the circumferential wall 153, the second tier of the rotary valve 10 includes the rotary component 50 having a first circumferential fluid opening 261 corresponding in position to the first circumferential segment (lower right corner in FIG. 7B), a second circumferential fluid opening 262 corresponding in position to the second circumferential segment, a third circumferential fluid opening 263 corresponding in position to the third circumferential segment, a fourth circumferential fluid opening 264 corresponding in position to the fourth circumferential segment, and a fifth circumferential fluid opening 265 corresponding in position to the fifth circumferential segment. The first circumferential segment of the rotary component 50 accordingly includes the first circumferential fluid opening 251 of the first tier aligned with and spaced apart from the first circumferential fluid opening 261 of the second tier with respect to the axial direction of the rotary valve 10. Similarly, the second circumferential fluid opening 252 of the first tier is axially aligned with and spaced apart from the second circumferential fluid opening 262 of the second tier while the third circumferential fluid opening 253 of the first tier is axially aligned with and spaced apart from the fourth circumferential fluid opening 264 of the second tier. These relationships are maintained regardless of the rotational position of the rotary component 50 relative to the valve body 60.

As can be seen in FIGS. 7A and 7B, a dividing structure 155 extends between different portions of the inner circumferential surface 175 of the rotary component 50 to divide the interior of the rotary component 50 into the three different fluid passageways 211, 212, 213. Specifically, the dividing structure 155 forms a wall extending from a boundary formed between the first circumferential segment and the second circumferential segment of the circumferential wall 153 to a boundary formed between the fourth circumferential segment and the fifth circumferential segment of the circumferential wall 153. The first fluid passageway 211 is formed to one side of the dividing structure 155 along the first and fifth circumferential segments while the second fluid passageway 212 is formed to an opposing side of the dividing structure 155 along the second, third, and fourth circumferential segments. The dividing structure 155 also defines an opening extending through the interior of the rotary component 50 for forming the third fluid passageway 213. The dividing structure 155 fluidly separates each of the fluid passageways 211, 212, 213 from one another within the rotary component 50. That is, the dividing structure 155 prevents direct fluid communication between any of the fluid passageways 211, 212, 213, hence none of the independent fluid flows passing through any one of the fluid passageways 211, 212, 213 mixes or otherwise combines with one another of the independent fluid flows passing through another one of the fluid passageways 211, 212, 213 within the confines of the circumferential wall 153 of the rotary component 50. The end walls 161, 162 of the rotary component 50 further delimit each of the fluid passageways 211, 212, 213 with respect to the axial direction of the rotary valve 10 as can be seen in FIG. 2.

The first fluid passageway 211 provides fluid communication between the first circumferential fluid opening 251 of the first tier and the first circumferential fluid opening 261 of the second tier. The second fluid passageway 212 provides fluid communication between any combination of the second circumferential fluid opening 252 of the first tier, the third circumferential fluid opening 253 of the first tier, the second circumferential fluid opening 262 of the second tier, the third circumferential fluid opening 263 of the second tier, and the fourth circumferential fluid opening 264 of the second tier. The third passageway 213 formed by the dividing structure 155 includes a 90 degree turn therein and provides fluid communication between the axial fluid opening 191 disposed along the axis of rotation of the rotary component 50 and the fifth circumferential fluid opening 265 of the second tier.

Referring again to FIG. 7A, the first tier of the rotary valve 10 includes the valve body 60 having a first circumferential fluid port 281 and a second circumferential fluid port 282. The first circumferential fluid port 281 is positioned along a first circumferential segment of the circumferential wall 69 of the valve body 60 that is instantaneously aligned radially with the first circumferential segment of the circumferential wall 153 of the rotary component 50 with respect to the illustrated first mode of operation of the rotary valve 10. Once again, the remaining circumferential segments of the circumferential wall 69 are formed in succession with respect to the circumferential direction of the valve body 60 (clockwise with respect to the perspective of FIG. 7A), wherein the second circumferential segment is disposed adjacent the first circumferential segment, the third circumferential segment is disposed adjacent the second circumferential segment, the fourth circumferential segment is disposed adjacent the third circumferential segment, and the fifth circumferential segment is disposed adjacent the fourth circumferential segment (as well as the first circumferential segment disposed opposite the fourth circumferential segment). Based on this convention, the second circumferential fluid port 282 of the first tier is positioned along the second circumferential segment of the circumferential wall 69 while the remaining third, fourth, and fifth circumferential segments of the circumferential wall 69 are formed by a continuous portion (arc) of the circumferential wall 69 devoid of one of the circumferential fluid ports 82.

Referring now to FIG. 7B while utilizing the same naming convention of the circumferential segments of the circumferential wall 69, the second tier of the rotary valve 10 includes the valve body 60 having a first circumferential fluid port 291 corresponding in position to the first circumferential segment and a second circumferential fluid port 292 corresponding in position to the second circumferential segment. The remaining third, fourth, and fifth circumferential segments of the circumferential wall 69 are once again formed by a continuous portion (arc) of the circumferential wall 69 devoid of one of the circumferential fluid ports 82. The first circumferential fluid port 281 of the first tier is aligned with and spaced apart from the first circumferential fluid port 291 of the second tier with respect to the axial direction of the rotary valve 10 while the second circumferential fluid port 282 of the first tier is similarly aligned with and spaced apart from the second circumferential fluid port 292 of the second tier with respect to the axial direction of the rotary valve 10.

The first mode of operation as shown in FIGS. 7A and 7B includes the rotary component 50 rotated to the illustrated position wherein the first circumferential fluid port 281 of the first tier is radially aligned with the first circumferential fluid opening 251 of the first tier, the second circumferential fluid port 282 of the first tier is radially aligned with the second circumferential fluid opening 282 of the first tier, the first circumferential fluid port 291 of the second tier is radially aligned with the first circumferential fluid opening 261 of the second tier, and the second circumferential fluid port 292 of the second tier is radially aligned with the second circumferential fluid opening 262 of the second tier. A first flow of the fluid flows, in order, through the first circumferential fluid port 291 of the second tier, the first circumferential fluid opening 261 of the second tier, the first flow passageway 211 formed through the rotary component 50, the first circumferential fluid opening 251 of the first tier, and then the first circumferential fluid port 281 of the first tier. A second flow of the fluid flows, in order, through the second circumferential fluid port 292 of the second tier, the second circumferential fluid opening 262 of the second tier, the second flow passageway 212 formed through the rotary component 50, the second circumferential fluid opening 252 of the first tier, and then the second circumferential fluid port 282 of the first tier.

In the illustrated flow configuration, the first and second circumferential fluid ports 291, 292 of the second tier act as fluid inlets of the rotary valve 10 while the first and second circumferential fluid ports 281, 282 of the first tier act as fluid outlets of the rotary valve 10. However, it should be readily apparent to one skilled in the art that one or both of the fluid flows may pass axially through the fluid passageways 211, 212 in opposing flow directions to that shown and described without departing from the scope of the present invention, depending on the flow configuration of the fluid through the remainder of the fluid system having the rotary valve 10. As such, any of the circumferential fluid ports 281, 282, 291, 292 may act as fluid inlets or fluid outlets into the rotary valve 10 with respect to the configuration of the rotary component 50 relative to the valve body 60 as shown in FIGS. 7A and 7B.

The second mode of operation as shown in FIGS. 8A and 8B includes the rotary component 50 rotated 72 degrees (counter clockwise from the illustrated perspective) from the rotational position of the rotary component 50 associated with the first mode of operation. The second mode of operation includes a configuration wherein the first circumferential fluid port 281 of the first tier is radially aligned with the second circumferential fluid opening 252 of the first tier, the second circumferential fluid port 282 of the first tier is blocked by a portion of the circumferential wall 153, the first circumferential fluid port 291 of the second tier is radially aligned with the second circumferential fluid opening 262 of the second tier, and the second circumferential fluid port 292 of the second tier is radially aligned with the third circumferential fluid opening 263 of the second tier. A first flow of the fluid flows, in order, through the first circumferential fluid port 291 of the second tier, the second circumferential fluid opening 262 of the second tier, the second flow passageway 212 formed through the rotary component 50, the second circumferential fluid opening 252 of the first tier, and then the first circumferential fluid port 281 of the first tier. A second flow of the fluid flows, in order, through the second circumferential fluid port 292 of the second tier, the third circumferential fluid opening 263 of the second tier, the second flow passageway 212 formed through the rotary component 50, the second circumferential fluid opening 252 of the first tier, and then the first circumferential fluid port 281 of the first tier.

In the illustrated flow configuration, the first and second circumferential fluid ports 291, 292 of the second tier act as fluid inlets of the rotary valve 10 while the first circumferential fluid port 281 of the first tier acts as a fluid outlet of the rotary valve 10, wherein the two flows of the fluid mix with each other within the second fluid passageway 212 before exiting the rotary component 50. However, it should be readily apparent to one skilled in the art that one or both of the fluid flows may pass through the second fluid passageway 212 using a different flow configuration to that shown and described without departing from the scope of the present invention, depending on the flow configuration through the remainder of the fluid system having the rotary valve 10. For example, the fluid may enter any two of the circumferential fluid ports 281, 291, 292, combine within the second fluid passageway 212, and then exit through the remaining one of the circumferential fluid ports 281, 291, 292, or the fluid may enter through a single one of the circumferential fluid ports 281, 291, 292, separate into two different partial flows within the second fluid passageway 212, and then exit through the remaining two of the circumferential fluid ports 281, 291, 292.

The third mode of operation as shown in FIGS. 9A and 9B includes the rotary component 50 rotated 72 degrees (counter clockwise from the illustrated perspective) from the rotational position of the rotary component 50 associated with the second mode of operation. The third mode of operation includes a configuration wherein the first circumferential fluid port 281 of the first tier is blocked by a portion of the circumferential wall 153, the second circumferential fluid port 282 of the first tier is radially aligned with the third circumferential fluid opening 253 of the first tier, the first circumferential fluid port 291 of the second tier is radially aligned with the third circumferential fluid opening 263 of the second tier, and the second circumferential fluid port 292 of the second tier is radially aligned with the fourth circumferential fluid opening 264 of the second tier. A first flow of the fluid flows, in order, through the first circumferential fluid port 291 of the second tier, the third circumferential fluid opening 263 of the second tier, the second flow passageway 212 formed through the rotary component 50, the third circumferential fluid opening 253 of the first tier, and then the second circumferential fluid port 282 of the first tier. A second flow of the fluid flows, in order, through the second circumferential fluid port 292 of the second tier, the fourth circumferential fluid opening 264 of the second tier, the second flow passageway 212 formed through the rotary component 50, the third circumferential fluid opening 253 of the first tier, and then the second circumferential fluid port 282 of the first tier.

In the illustrated flow configuration, the first and second circumferential fluid ports 291, 292 of the second tier act as fluid inlets of the rotary valve 10 while the second circumferential fluid port 282 of the first tier acts as a fluid outlet of the rotary valve 10, wherein the two flows of the fluid mix with each other within the second fluid passageway 212 before exiting the rotary component 50. However, it should be readily apparent to one skilled in the art that one or both of the fluid flows may pass through the second fluid passageway 212 using a different flow configuration to that shown and described without departing from the scope of the present invention, depending on the flow configuration through the remainder of the fluid system having the rotary valve 10. For example, the fluid may enter any two of the circumferential fluid ports 282, 291, 292, combine within the second fluid passageway 212, and then exit through the remaining one of the circumferential fluid ports 282, 291, 292, or the fluid may enter through a single one of the circumferential fluid ports 282, 291, 292, separate into two different partial flows within the second fluid passageway 212, and then exit through the remaining two of the circumferential fluid ports 282, 291, 292.

The fourth mode of operation as shown in FIGS. 10A and 10B includes the rotary component 50 rotated 144 degrees (counter clockwise from the illustrated perspective) from the rotational position of the rotary component 50 associated with the third mode of operation. The fourth mode of operation includes a configuration wherein the first circumferential fluid port 281 of the first tier is blocked by a portion of the circumferential wall 153, the second circumferential fluid port 282 of the first tier is radially aligned with the first circumferential fluid opening 251 of the first tier, the first circumferential fluid port 291 of the second tier is radially aligned with the fifth circumferential fluid opening 265 of the second tier, and the second circumferential fluid port 292 of the second tier is radially aligned with the first circumferential fluid opening 261 of the second tier. A first flow of the fluid flows, in order, through the first circumferential fluid port 291 of the second tier, the fifth circumferential fluid opening 265 of the second tier, the third flow passageway 213 formed through the rotary component 50, the axial fluid opening 191 of the rotary component 50, and then the axial fluid port 83 of the valve body 60. A second flow of the fluid flows, in order, through the second circumferential fluid port 292 of the second tier, the first circumferential fluid opening 261 of the second tier, the first flow passageway 211 formed through the rotary component 50, the first circumferential fluid opening 251 of the first tier, and then the second circumferential fluid port 282 of the first tier.

In the illustrated flow configuration, the first and second circumferential fluid ports 291, 292 of the second tier act as fluid inlets of the rotary valve 10 while the second circumferential fluid port 282 of the first tier and the axial fluid port 83 act as fluid outlets of the rotary valve 10. However, it should be readily apparent to one skilled in the art that one or both of the fluid flows may pass through the fluid passageways 211, 213 using a different flow configuration to that shown and described without departing from the scope of the present invention, depending on the flow configuration through the remainder of the fluid system having the rotary valve 10. Specifically, the flow direction through one or both of the fluid passageways 211, 213 may be reversed, as desired, to switch which of the ports 83, 282, 291, 292 act as the inlets and the outlets of the rotary valve 10.

Although the rotary valve 10 is shown and described as utilizing the rotary component 50 having the outer circumferential surface 171 with the variable radius to form the sealing zones 172 and the non-sealing zones 173, it should be apparent to one skilled in the art that the different flow configurations disclosed with respect to the rotary valve 10 may be beneficially utilized in the absence of the formation of the sealing zones 172 and the non-sealing zones 173 without necessarily departing from the scope of the present invention. That is, the novel flow configurations through the rotary valve 10 may be useful in the absence of the lowered frictional forces supplied by the different zones 172, 173, hence the rotary valve 10 is not limited only to embodiments including this feature.

The four disclosed modes of operation of the rotary valve 10 are now discussed with reference to the exemplary fluid system 301 of FIG. 6 in order to illustrate one possible use of the rotary valve 10 as a five-way switching valve. As mentioned previously, the fluid system 301 as illustrated in FIG. 6 is representative of a coolant system of an electric vehicle utilizing water as the coolant circulating through the rotary valve 10. However, it should be apparent that the flexibility of the rotary valve 10 in prescribing different flow configurations therethrough may be beneficially adapted for use with any fluid system having five different flow paths merged at a single valve element.

The fluid system 301 includes a radiator coolant loop 310, a battery coolant loop 320, and an electric component coolant loop 330. The radiator coolant loop 310 and the battery coolant loop 320 may be placed in fluid communication with each other via the rotary valve 10 or by a pair of valves 315, 325 disposed remotely from the rotary valve 10 with respect to each of the loops 310, 320. A pump 303 is disposed immediately upstream of the rotary valve 10 with respect to each of the loops 310, 320 to cause the water to flow through each of the loops 310, 320 in a desired flow direction.

The battery coolant loop 320 is in heat exchange relationship with the electric component coolant loop 330 via a coolant-to-coolant heat exchanger 305. The electric component coolant loop 330 includes at least one electric component 335 of the electric vehicle for exchanging heat energy with the coolant circulated through the electric component coolant loop 330. The at least one electric component 335 may be configured to generate heat that can be transferred to the battery coolant loop 320 via the coolant-to-coolant heat exchanger 305.

The radiator coolant loop 310 includes a radiator 312, the valve 315, at least one electric drive unit 314, one of the pumps 303, and the rotary valve 10. A bypass flow path 318 extends from the rotary valve 10 to a position on the radiator coolant loop 310 downstream of the radiator 312 and upstream of the valve 315. The radiator coolant loop 310 also includes a pair of temperature sensors 302 for determining the temperature of the coolant immediately upstream of the radiator 312 and downstream of the position where the bypass flow path 318 joins the radiator coolant loop 310, wherein the determination of the temperature of the coolant may be utilized to determine the mode of operation of the rotary valve 10 for bypassing the radiator 312. The battery coolant loop 320 includes the coolant-to-coolant heat exchanger 305, a chiller 321, the valve 325, a battery 322, a battery charger 323, one of the pumps 303, and the rotary valve 10.

According to the first mode of operation disclosed in FIGS. 7A and 7B, the rotary valve 10 communicates a first flow of the coolant from the port 291 to the port 281 and a second flow of the coolant from the port 292 to the port 282. This mode of operation includes the flow of the coolant through the battery 322 and the battery charger 323 of the battery coolant loop 320 flowing through the rotary valve 10 to be subsequently passed through the radiator 312 of the radiator coolant loop 310 to remove heat from the coolant. Additionally, the flow of the coolant through the at least one electric drive unit 314 is bypassed around the radiator 312 via flow through the bypass flow path 318. The first mode of operation may also include the valve 315 distributing the coolant towards the valve 325 for passage through the battery 322 and the battery charger 323 as well as towards the at least one electric drive unit 314.

The second mode of operation disclosed in FIGS. 8A and 8B includes the rotary valve 10 communicating the coolant from each of the ports 291, 292 to the port 281. This results in the portion of the coolant passing through the at least one electric drive component 314 and the portion of the coolant passing through the battery 322 and the battery charger 323 combining within the rotary valve 10 before being passed through the radiator 312 to remove heat from the combined coolant flow. The second mode of operation relies upon the valve 315 distributing the coolant to the at least one electric drive unit 314 as well as the valve 325 for subsequent passage through the battery 322 and the battery charger 323.

The third mode of operation disclosed in FIGS. 9A and 9B includes the rotary valve 10 communicating the coolant from each of the ports 291, 292 to the port 282. This results in the portion of the coolant passing through the at least one electric drive component 314 and the portion of the coolant passing through the battery 322 and the battery charger 323 combining within the rotary valve 10 before being passed through the bypass flow path 318 for bypassing the radiator 312. The third mode of operation relies upon the valve 315 distributing the coolant to the at least one electric component 314 as well as the valve 325 for subsequent passage through the battery 322 and the battery charger 323.

The fourth mode of operation disclosed in FIGS. 10A and 10B includes the rotary valve 10 communicating a first flow of the coolant from the port 291 to the axially arranged port 191 as well as a second flow of the coolant from the port 292 to the port 282. Additionally, the valves 315, 325 are adjusted to send all coolant encountering each of the valves 315, 325 to flow towards the inlet ports 291, 292 of the rotary valve 10, hence no coolant is exchanged between the valves 315, 325. This configuration results in the coolant flowing through the two loops 310, 320 in a figure-eight flow shape. Specifically, the flow of the coolant through the battery 322 and the battery charger 323 is passed through the rotary valve 10 towards the radiator 312. The flow exiting the radiator 312 then flows through the at least one electric drive unit 314 and the rotary valve 10 towards the coolant-to-coolant heat exchanger 305. The coolant of the battery coolant loop 320 exchanges heat energy with the coolant of the electric component coolant loop 330 within the coolant-to-coolant heat exchanger 305. The coolant may then exchange additional heat energy with another fluid within the chiller 321 before flowing back through the battery 322 and the battery charger 323 to start the circulating process again.

The fourth mode of operation may be utilized during periods of time when the battery 322 of the electric vehicle is in need of heating to achieve a desired degree of efficiency thereof, such as when the electric vehicle is first started when the electric vehicle is exposed to an especially cold ambient environment. The coolant-to-coolant heat exchanger 305 beneficially allows for heat to be added to the coolant from the electric component coolant loop 330 prior to passage of the coolant through the battery 322, thereby allowing for the battery 322 to be heated more quickly. The flow of the coolant in sequence through each of the loops 310, 320 during the fourth mode of operation also beneficially allows for the heat generated by the at least one electric drive unit 314 to similarly be transferred to the battery 322 prior to the heat being removed from the coolant within the radiator 312, thereby further aiding in quickly heating the battery 322.

The use of the rotary component 50 having the variably radiused sealing zones 172 and non-sealing zones 173 allows for a lower total radial force to be applied to the rotary component 50 in comparison to the rotary components of the prior art. Specifically, the different operational positions of the rotary component 50 include at least some of the sealing elements 20 being compressed between the sealing zones 172 and the valve body 60 with the first sealing force and some of the sealing elements 20 being compressed between the non-sealing zones 173 and the valve body 60 with the lower second sealing force. By reducing the sealing force present with respect to at least some of the sealing elements 20 via the smaller radius of the non-sealing zones 173, the frictional forces present between the engaging hard sealing structure 21 and the rotary component 50 are reduced at various positions on the outer circumferential surface 171. As such, the total frictional forces present between the rotary component 50 and the sealing elements 20 is reduced, thereby requiring less torque to rotate the rotary component 50 relative to the valve body 60. The reduced torque requirement beneficially expands the suitable rotary motors or actuators capable for use with the rotary valve 10 while also reducing the amount of energy required to rotate the rotary component 50 relative to the valve body 60. The lower torque requirement may also beneficially allow for the rotary motor or actuator to be smaller in size to reduce a packaging space of any assembly including the rotary valve 10.

The disclosed configuration of the rotary valve 10 also allows for the rotary valve 10 to control flow of the coolant through five different ports 83, 281, 282, 291, 292 of the valve body 60 via the use of a single rotary component 50, hence the rotary valve 10 is operational as a five-way switching valve despite having only a single actuating input. This is possible due to the two-tiered configuration of the rotary component 50 and the valve body 60, as the specific configuration of the fluid passageways 211, 212, 213 formed through the rotary component 50 allows for the coolant to be communicated axially between the two tiers to expand the number of possible flow configurations through the rotary valve 10. The rotary valve 10 is accordingly compact and able to be more easily integrated into any fluid system in need of a valve capable of controlling flow through at least five different flow paths meeting at the valve. The use of a single valve for controlling multiple different flow paths also simplifies the fluid system while eliminating potential problems associated with simultaneously controlling multiple valve elements or a valve element having multiple moving parts.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A rotary valve comprising:
a rotary component configured to rotate about an axis of rotation thereof, the rotary component including a plurality of fluid openings formed at an exterior surface thereof with each of the fluid openings forming a fluid inlet or a fluid outlet into one of a plurality of fluid passageways formed through the rotary component;
a valve body rotatably receiving the rotary component therein, the valve body including a plurality of fluid ports formed therethrough with each of the fluid ports configured to be selectively aligned with one of the fluid openings of the rotary component depending on a rotational position of the rotary component relative to the valve body, wherein the plurality of the fluid openings includes a plurality of circumferential fluid openings formed through a circumferential wall of the rotary component, and wherein the plurality of the fluid ports includes a plurality of circumferential fluid ports formed through a circumferential wall of the valve body, wherein the circumferential fluid openings and the circumferential fluid ports are arranged in a first tier and a second tier, the first tier having a first plurality of the circumferential fluid openings and a first plurality of the circumferential fluid ports arranged on a first plane and the second tier having a second plurality of the circumferential fluid openings and a second plurality of the circumferential fluid ports arranged on a second plane, wherein the first plane and the second plane are each arranged perpendicular to the axis of rotation of the rotary component, and wherein the first plane is spaced apart axially from the second plane with respect to the axis of rotation of the rotary component, wherein the circumferential wall of the rotary component is divided into five equal circumferential segments including a first circumferential segment, a second circumferential segment, a third circumferential segment, a fourth circumferential segment, and a fifth circumferential segment when progressing in a first circumferential direction, wherein the first plurality of the circumferential fluid openings includes a first circumferential fluid opening of the first tier formed within the first circumferential segment, a second circumferential fluid opening of the first tier formed within the second circumferential segment, and a third circumferential fluid opening of the first tier formed within the fourth circumferential segment, and wherein the second plurality of the circumferential fluid openings includes a first circumferential fluid opening of the second tier formed within the first circumferential segment, a second circumferential fluid opening of the second tier formed within the second circumferential segment, a third circumferential fluid opening of the second tier formed within the third circumferential segment, a fourth circumferential fluid opening of the second tier formed within the fourth circumferential segment, and a fifth circumferential fluid opening of the second tier formed within the fifth circumferential segment, and wherein the plurality of fluid passageways include a first fluid passageway fluidly coupled to each of the first circumferential fluid opening of the first tier and the first circumferential fluid opening of the second tier, a second fluid passageway fluidly coupled to each of the second circumferential fluid opening of the first tier, the third circumferential fluid opening of the first tier, the second circumferential fluid opening of the second tier, the third circumferential fluid opening of the second tier, and the fourth circumferential fluid opening of the second tier, and a third fluid passageway fluidly coupled to each of the fifth circumferential fluid opening of the second tier and an axial fluid opening of the plurality of the fluid openings formed through an axial end wall of the rotary component.

2. The rotary valve of claim 1, wherein at least one of the fluid passageways formed through the rotary component is in fluid communication with at least one of the circumferential fluid openings of the first tier and at least one of the circumferential fluid openings of the second tier.

3. The rotary valve of claim 1, wherein at least two of the fluid passageways formed through the rotary component are in fluid communication with at least one of the circumferential fluid openings of the first tier and at least one of the circumferential fluid openings of the second tier.

4. The rotary valve of claim 1, wherein the first plurality of the circumferential fluid openings of the first tier includes three of the circumferential fluid openings spaced circumferentially about the circumferential wall of the rotary component and wherein the second plurality of the circumferential fluid openings of the second tier includes five of the circumferential fluid openings spaced circumferentially about the circumferential wall of the rotary component, and wherein the first plurality of the circumferential fluid ports of the first tier includes two of the circumferential fluid ports spaced circumferentially from each other about the circumferential wall of the valve body and the second plurality of the circumferential fluid ports of the second tier includes two of the circumferential fluid ports spaced circumferentially from each other about the circumferential wall of the valve body.

5. The rotary valve of claim 1, wherein the circumferential wall of the valve body is divided into five equal circumferential segments, wherein the first plurality of the circumferential fluid ports includes a first circumferential fluid port of the first tier and a second circumferential fluid port of the first tier disposed within circumferentially adjacent circumferential segments of the circumferential wall of the valve body, and wherein the second plurality of the circumferential fluid ports includes a first circumferential fluid port of the second tier axially aligned with the first circumferential fluid port of the first tier and a second circumferential fluid port of the second tier axially aligned with the second circumferential fluid port of the first tier.

6. The rotary valve of claim 5, wherein a first mode of operation of the rotary valve includes the first circumferential fluid port of the first tier fluidly coupled to the first circumferential fluid port of the second tier through the first fluid passageway and the second circumferential fluid port of the first tier fluidly coupled to the second circumferential fluid port of the second tier through the second fluid passageway, a second mode of operation of the rotary valve includes each of the first circumferential fluid port of the second tier and the second circumferential fluid port of the second tier fluidly coupled to the first circumferential fluid port of the first tier through the second fluid passageway, a third mode of operation of the rotary valve includes each of the first circumferential fluid port of the second tier and the second circumferential fluid port of the second tier fluidly coupled to the second circumferential fluid port of the first tier through the second fluid passageway, and a fourth mode of operation of the rotary valve includes the second circumferential fluid port of the first tier fluidly coupled to the second circumferential fluid port of the second tier through the first passageway and the first circumferential fluid port of the second tier fluidly coupled to an axial fluid port of the plurality of the fluid ports formed through an axial end wall of the valve body through the third fluid passageway.

7. The rotary valve of claim 1, wherein all of the fluid passageways formed through the rotary component are fluidly separated from each other within the rotary component.

8. The rotary valve of claim 1, wherein a dividing structure forms a division between the fluid passageways within the rotary component.

9. The rotary valve of claim 8, wherein the dividing structure extends across a circumferential wall of the rotary component to separate a first fluid passageway from a second fluid passageway, and wherein the dividing structure defines an enclosed opening forming a third fluid passageway.

10. The rotary valve of claim 1, wherein at least one sealing element is disposed radially between an inner circumferential surface of the valve body and an outer circumferential surface of the rotary component, the outer circumferential surface of the rotary component having at least one sealing zone having a first radius measured from the axis of rotation and at least one non-sealing zone having a second radius measured from the axis of rotation, the first radius greater than the second radius.

11. The rotary valve of claim 10, wherein each of the at least one sealing elements applies a first sealing force to the rotary component when engaging one of the sealing zones or a second sealing force to the rotary component when engaging one of the non-sealing zones, the first sealing force greater than the second sealing force.

12. The rotary valve of claim 10, wherein the plurality of the fluid openings includes a plurality of circumferential fluid openings formed through a circumferential wall of the rotary component, wherein each of the sealing zones surrounds a perimeter of one of the circumferential fluid openings and each of the non-sealing zones is spaced from the perimeter of each of the circumferential fluid openings.

13. A rotary valve comprising:
a rotary component configured to rotate about an axis of rotation thereof, the rotary component including a plurality of fluid openings formed at an exterior surface thereof with each of the fluid openings forming a fluid inlet or a fluid outlet into one of a plurality of fluid passageways formed through the rotary component; and
a valve body rotatably receiving the rotary component therein, the valve body including a plurality of fluid ports formed therethrough with each of the fluid ports configured to be selectively aligned with one of the fluid openings of the rotary component depending on a rotational position of the rotary component relative to the valve body, wherein the valve body includes five of the fluid ports and the rotary valve operates as a five-way switching valve, wherein the five of the fluid ports includes a first inlet port, a second inlet port, a first outlet port, a second outlet port, and a third outlet port, wherein a first mode of operation of the rotary valve includes the first inlet port fluidly coupled to the first outlet port and the second inlet port fluidly coupled to the second outlet port, a second mode of operation of the rotary valve includes the first inlet port and the second inlet port both fluidly coupled to the first outlet port, a third mode of operation of the rotary valve includes the first inlet port and the second inlet port both fluidly coupled to the second outlet port, and a fourth mode of operation of the rotary valve includes the first inlet port fluidly coupled to the third outlet port and the second inlet port fluidly coupled to the second outlet port.

* * * * *